May 27, 1952   F. Z. FOUSE   2,598,524
METHOD AND APPARATUS FOR MANUFACTURING GLASSWARE
Filed Oct. 11, 1948   2 SHEETS—SHEET 1

INVENTOR.
Frederick Z. Fouse
BY
Norman N. Holland
ATTORNEY

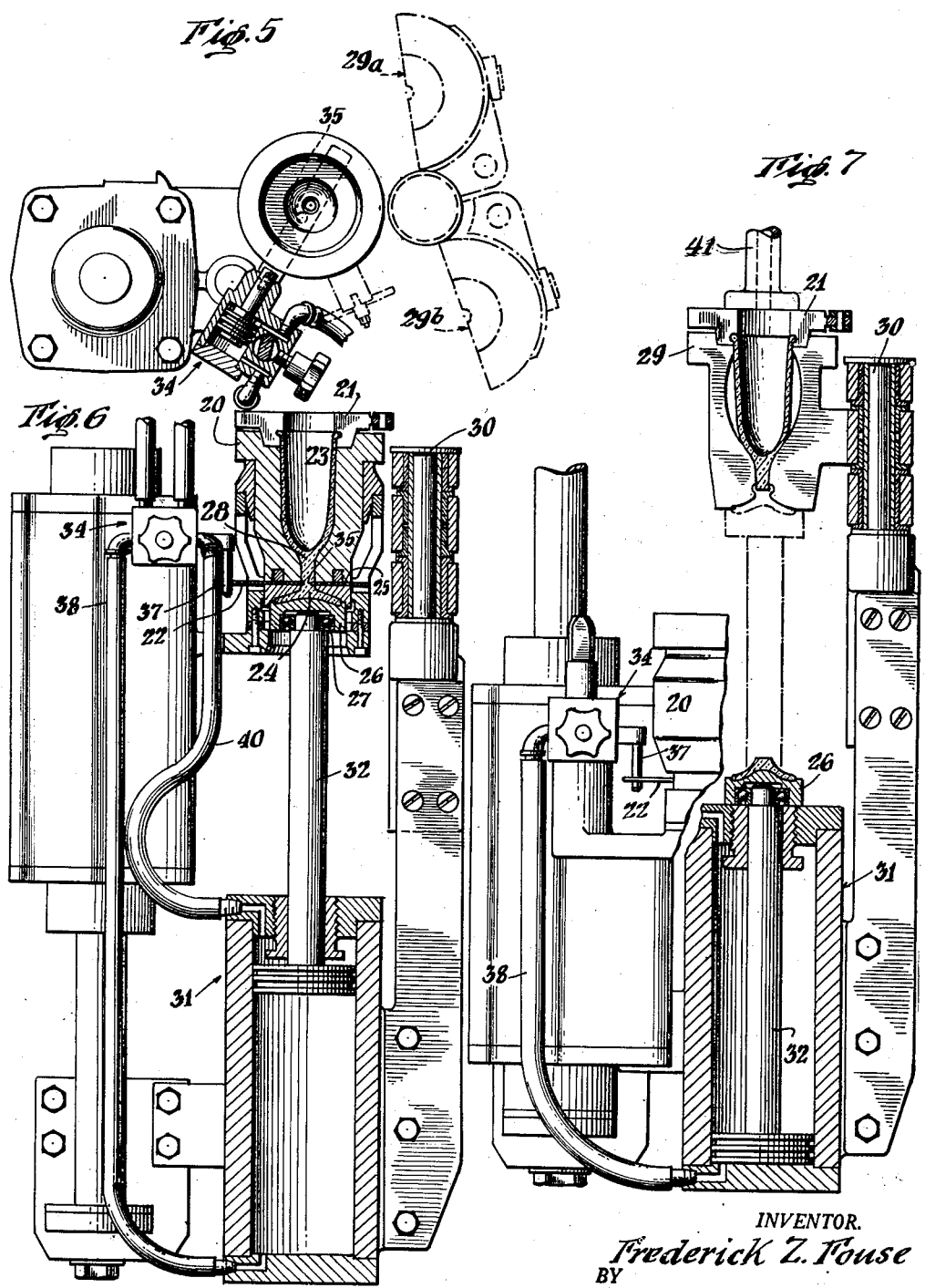

Patented May 27, 1952

2,598,524

UNITED STATES PATENT OFFICE 2,598,524

METHOD AND APPARATUS FOR MANUFACTURING GLASSWARE

Frederick Z. Fouse, Lancaster, Ohio, assignor to Anchor Hocking Glass Corporation, Lancaster, Ohio, a corporation of Delaware Application October 11, 1948, Serial No. 53,775

12 Claims. (Cl. 49—1)

The present invention relates to the manufacture of ware having enlarged or outwardly projecting portions connected by a portion of reduced dimension, for example goblets, vases or other footed ware.

In the manufacture of articles from glass and the like, it is preferable to preliminarily press a gob of glass while in a one-piece or non-partible mold, and to thereafter further shape the resulting blank, by air pressure, in a split or partible mold. The one-piece or blank mold has no seam to form an objectionable parting line on the article and the glass is sufficiently hard when it reaches the split blow mold so that any seam produced therein is not pronounced; rotating the blank during blowing in the split mold prevents formation of an unsightly mold parting line.

As the one-piece mold cannot be opened for removal of a preliminarily shaped article, its use has been limited to forming blanks of such shapes as permitted their withdrawal from the mold opening. This procedure is satisfactory for the manufacture of articles such as tumblers which may be readily separated from the blank mold and transferred to the split or partible mold since in such instances the shape of the article permits its ready separation from the mold.

Footed ware, however, has not been so produced because there is no way to get the blank out of the mold; neither the bowl portion nor the foot portion of the article is small enough to pass through the reduced dimension cavity required to mold the connecting stem or neck-like portion of the article. Previous attempts to get around the difficulty by separately molding the bowl and the foot and stem parts are expensive and unduly complicated; they require an excessive number of operations as well as special molding equipment and machinery.

The present invention aims to overcome the above and other difficulties and disadvantages by providing a new and improved method and apparatus which may be used for manufacturing footed ware and the like by pressing a gob into preliminary or blank form while in a non-partible mold, separating certain portions of the preliminarily formed article while in that mold, and by further forming and rejoining the parts of the article in a split or partible mold. The invention further contemplates the provision of such method and apparatus which may be readily embodied with present glass-making machinery.

An object of the present invention is to provide a new and improved method of manufacturing footed ware and the like.

Another object of the invention is to provide a new and improved method of manufacturing footed ware and the like which may be used with present glass-making machinery.

Another object of the invention is to provide new and improved apparatus for manufacturing footed ware and the like.

Another object of the invention is to provide new and improved apparatus for manufacturing articles such as footed ware which may be readily embodied with present glass-making machinery.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 5 is a horizontal view, partly in section, illustrating an apparatus or mechanism for performing the present method;

Fig. 6 is an elevational view, partly in section, of the apparatus or mechanism shown in Fig. 5; and Fig. 7 is an elevational view, partly in section, showing the apparatus or mechanism of Fig. 5 in another relationship.

Figure 1:
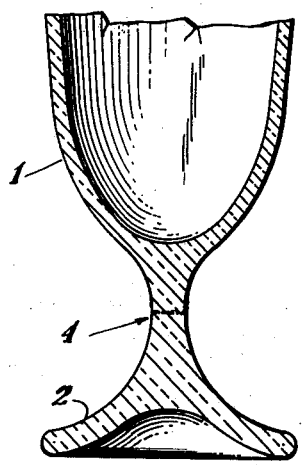
Fig. 1 is a fragmentary sectional view illustrating one type of glassware which may be manufactured by the present method and apparatus.
Figure 2:
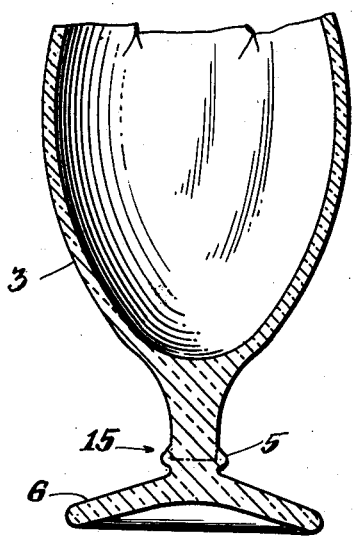
Fig. 2 is a fragmentary sectional view illustrating another type of ware which may be manufactured by the present method and apparatus.

Types of goblets or vases which may be made by utilizing the present method and apparatus are shown in Figs. 1 and 2. Each goblet comprises, respectively, an upper bowl portion 1, 3 a footed portion 2, 6 and a reduced connecting portion 4, 15. The goblet of Fig. 2 differs from that of Fig. 1 in that the latter includes an enlargement 5 at the stem portion thereof, the enlargement being provided for reinforcing effect, enhanced decorative appearance, or both. For purposes of convenience in description, the method and apparatus will be described chiefly with reference to the manufacture of articles such as are shown in Figs. 1 and 2, but it will be understood that the invention may be applied to the manufacture of other types of ware having spaced portions connected by a stem or necklike portion.

Figure 3:
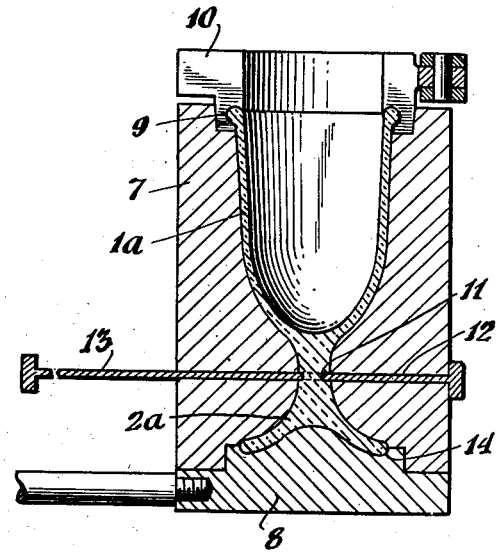
Figs. 3 and 4 are simplified sectional views illustrating more particularly the method of the present invention.
Figure 4:
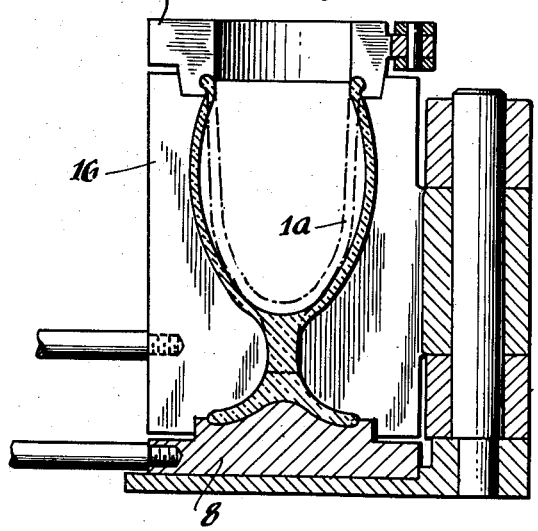

The method of making the articles of Figs. 1 and 2 is shown generally and in simplified manner in Figs. 3 and 4, the method being shown and to be described chiefly in connection with the manufacture of the article shown in Fig. 1.

As shown in these figures, the gob of glass in plastic condition is first deposited in a one-piece or non-partible mold 7 which has a smooth internal surface uninterrupted by seams or joints. As used herein the term "non-partible mold" is intended to indicate a mold that is not normally partible along a plane extending through the enlarged and reduced dimension portions of articles such as illustrated in Figs. 1 and 2; the mold may of course be produced by building it up from a plurality of parts instead of hollowing out a single block of metal. After the bottom plate or member 8 is positioned to close the lower end of the mold 7 the usual plunger (not shown) is inserted into the mouth of the mold and displaces or presses the gob into the preliminary shape illustrated. In the pressing operation some of the glass flows or passes upwardly and fills the annular groove 9 in the neck ring 10; other glass passes downwardly through a reduced dimension stem-forming cavity or opening and into the foot-forming cavity or opening 14 provided by the co-operating mold 7 and bottom plate 8. As the glass moves through the reduced dimension cavity of the mold it passes through an aligned opening 11 in a movable shear blade 13 located in a transversally extending slot 12 in the mold.

The glass at this time is in plastic condition and movement of the shear blade 13 through the mold slot 12 severs the preliminarily shaped bowl portion 1a from the foot portion 2a. As the shear blade 13 is moved toward the right, the opening 11 therein, together with the "slug" of glass, is moved to the outside of the mold 7 and the slug may be removed from the opening. The shear blade may be of any suitable thickness and in some instances it may be sufficiently thin to cut the glass similarly to a pair of shears.

After being severed by the shear blade 13, the mold 7 and the neck ring 10 are separated with respect to each other so that the bowl portion 1a is suspended from the neck ring 10. The bottom plate 8 and mold 7 are also separated with respect to each other so that the foot portion 2a is clear of the mold 7. The thus separated portions are then presented to the partible or split blow mold 16 (Fig. 4). After the bowl portion 1a of the preliminarily shaped article is enclosed by the split mold, it and the split mold may be rotated with respect to each other. While this rotation may be achieved in any suitable manner, it is usually performed by turning the neck ring 10 with respect to the mold. Simultaneously with rotation of the neck ring 10 a blow head (not shown) commences supplying air pressure to the interior of the blanked article to shape it to the interior of the split mold 16.

At about the time that the neck ring 10 commences turning and the blow head starts supplying air pressure, the bottom plate 8 moves the previously severed foot portion 2a into the lower part of the mold 16. As the lowermost end of the severed bowl-shaped portion 1a moves downwardly into the reduced dimension portion of the split mold, under the influence of air pressure, the severed ends of the bowl portion and the foot portion come into contact. Holding the foot up in position during downward extension of the stem portion by the air pressure causes the severed ends to weld firmly together.

Upon completion of this shaping the resulting article may be readily removed from the split mold 16 by opening the opposite halves thereof. Subsequent to removal the shaped article may be subjected to any desired cutting off, fire polishing, or finished operations.

A preferred apparatus or mechanism for practicing the method is shown in Figs. 5, 6 and 7. Its use will be described chiefly with reference to manufacturing articles of the type illustrated in Fig. 2 having the enlargement or bulge 5, but it is equally adaptable to make other articles, for example that shown in Fig. 1. The apparatus or mechanism is readily adaptable to use with, and will be described chiefly with reference to, continuously operating and entirely automatic glassware-making machines of the so-called "paste mold" type. It may be bolted onto convenient parts of such machines.

As shown, the apparatus includes the parts referred to in connection with the description of the method; namely, a non-partible blank mold 20 with enlarged cavities 23 and 24 and a reduced cavity 28 for partially or preliminarily shaping a glass article, a neck ring 21 for supporting a portion of the article and facilitating its transfer, an apertured and reciprocable shear blade 22 extending through a slot 25 in the non-partible mold 20, a movable bottom member or plate 26, and a split blow mold 29 mounted on a pin or pivot 30 adjacent one side of the blank mold.

The blank mold 20 is movable between the usual lowered position of Fig. 7 and an elevated position of Fig. 6, one of the positions being at a greater distance from the center of the machine than the other. In the customary manner as the blank mold approaches or moves away from the elevated position of Fig. 6, it travels vertically so that the mold may freely strip away from the bowl portion 1a of a partially formed glass article which is shaped in the mold by the customary pressing plunger (not shown).

The blank mold 20 may receive its glass charge at a lower outer position while the mold is being moved in a circuit due to continuous rotation of the glass machine turret.

After receiving the glass charge or gob, the blank mold 20 raises to the pressing position of Fig. 6 and the bottom plate 26 raises against the bottom of the blank mold. Raising of the bottom plate is achieved by movement of an air motor or air pressure operated "valve" 31 which carries the bottom plate at the upper end of its rod 32. Air pressure supplied at one end of the air motor 31 through hose 38 serves to raise the bottom plate 26 and also actuates an air motor or valve 34, which is connected with the shear blade 22; when the bottom plate 26 is raised the shear blade is returned from a previous cutting position to place the opening 35 thereof in alignment with the stem-forming opening of the mold 20. The air pressure referred to may be supplied by suitable conduits connected with the glass machine.

In this relationship of parts (Fig. 6) a plunger (not shown) of the glass machine presses the charge to form it into preliminary shape. During this pressing operation glass passes through the opening 35 in the shear blade to form the foot portion of the ware.

The shear blade 22 may be of any suitable thickness, for example about 1/8 of an inch, although any other appropriate dimension may be used. The opening in the shear blade through which glass passes preferably acts as a choke and may vary in size to suit the filling of the foot cavity of the mold.

After the gob is pressed into preliminary shape the shear blade pin 37 and apertured shear blade 22 are actuated by air pressure supplied to the air motor 34, to cut through the reduced portion and separate the bowl and foot portions. Air pressure also passes through into the hose 40 and thence into the upper end of the second air motor 31 to move the rod 32 and bottom plate 26, together with the severed foot portion, downwardly. The blank mold 20 then moves downwardly away from the neck ring 21 and swings to one side. The neck ring 21 continues to support the downwardly extending bowl portion.

Opposite halves 29a and 29b of the split mold close around the bowl portion, from the position shown in Fig. 5 to that of Fig. 7, and the neck ring commences to rotate the bowl portion through the desired number of degrees. Such rotation may be obtained in the usual manner by gears (not shown) that interconnect the neck ring with a suitable drive shaft. This relative rotation could also be obtained by rotating the blow mold in similar manner with respect to the blow head instead of rotating the neck ring. The blow head 41 supplies air to the interior of the partially formed bowl and expansion and downward movement of its lower end occurs.

As previously mentioned in connection with the description of the method, at about the time the blow head commences supplying air pressure the bottom plate raises the uppermost end of the severed foot portion up into the mold and the severed ends join firmly together to provide a unitary goblet. The bottom plate 26 is preferably mounted on ball bearings 27 so that it and the foot portion supported thereby may freely rotate with the bowl portion which welds to the foot portion.

In Fig. 7, the blow mold 29 is shown having an annular enlargement or recess adjacent the area where the severed ends are joined together in the blow mold. Preferably the movable bottom plate 26 raises the severed foot portion about 1/4 inch higher in the blow mold than its elevation in the blank or non-partible mold and this tends to press the severed ends more firmly together and also forms a decorative ridge on the stem. For different sizes of tumblers and shapes of bulges, appropriate distances other than about 1/4 inch may be utilized.

After forming the article as described, the bottom plate may be lowered, by air pressure supplied through the hose 40, the split blow mold opens, and take out or removal of the article may occur.

It will be seen that the present invention provides a new and improved method and apparatus which may be used for manufacturing various items of footed ware such as vases or goblets, and other ware of generally similar nature. The method and apparatus are relatively simple in construction and operation and may be embodied with existing automatic glass machinery; they are adapted to rapid manufacture of articles, a production speed of about fifty goblets per minute being normally employed. The automatic operation of the apparatus in practicing the method, together with its relatively high rate of production, makes possible the production of footed ware at considerably less cost than has previously been possible.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of manufacturing a glass article having portions of enlarged dimension connected by a portion of reduced dimension which comprises, placing a moldable glass charge in a mold having enlarged and reduced dimension cavities, shaping the charge into the general form of the mold, severing said glass at said portion of reduced dimension while in said mold, removing the severed parts from said mold, and thereafter attaching said severed parts together at their areas where previously severed.

2. The method of manufacturing a glass article and the like having portions of enlarged dimension connected by a portion of reduced dimension which comprises, preliminarily forming the article in a first mold having cavities of enlarged dimension connected by a cavity of reduced dimension, severing said preliminarily formed article at said portion of reduced dimension while in said mold, removing the severed portions from said first mold, and thereafter further forming said preliminarily formed article and joining together said severed portions.

3. The method of manufacturing a one-piece article having a neck-like portion intermediate enlarged portions which comprises, shaping an article in a mold having cavities conforming generally to said portions of the article, removing and discarding a part of said neck-like portion while the remainder thereof remains in said mold, subsequently removing the resulting separated parts from said mold, and thereafter joining together said separated parts at their area of separation to form a one-piece article.

4. Apparatus for forming articles having enlarged portions connected by a stem-like portion, comprising a first mold free of longitudinal seam lines provided with a stem-forming cavity connecting spaced larger cavities and having an aperture therein adjacent said stem-forming cavity, severing means movable in said aperture for severing an article at said stem, a split mold, a movable mold bottom adapted to close the bottom of said first mold and to close the bottom of said split mold, and means for actuating said movable mold bottom to alternatively close the bottoms of said first mold and said split mold.

5. Apparatus for forming articles having enlarged portions connected by a stem-like portion, comprising a non-partible mold provided with spaced recesses connected by a stem-forming aperture and having an opening therein adjacent said stem-forming aperture, severing means movable in said opening for severing an article at said stem, a partible mold, a movable bottom adapted to close the bottom of either of said molds, and means for actuating said stem severing means and raising and lowering said mold bottom.

6. The method of manufacturing an article having portions of enlarged dimension joined by a portion of reduced dimension which comprises, placing a moldable material in a mold having cavities of enlarged dimension joined by a cavity of reduced dimension, causing the material to conform generally to said mold cavities, separating said material into parts at said portion of reduced dimension prior to removal from the mold, subsequently removing the separated parts from said mold, and thereafter attaching together said separated parts at their areas of separation.

7. The method of manufacturing an article having a neck-like portion intermediate enlarged portions which comprises, shaping a charge of material while in a mold having neck-like and enlarged cavities, severing the shaped material at said neck-like cavity to form a plurality of parts, separating the parts from said mold, joining together severed edges of said neck-like portion, and forming a reinforcing enlargement adjacent said joined edges.

8. The method as claimed in claim 7, in which said enlargement is formed by forcibly pressing said parts together to laterally displace the material adjacent said severed edges.

9. In a device of the class described adapted to be used for forming an article having enlarged portions connected by a reduced dimension portion, the combination of an open ended non-partible mold having cavities of enlarged dimension connected by a cavity of reduced dimension, severing means adjacent said reduced dimension cavity movable across said latter cavity for severing a reduced portion of an article, means for closing one of the enlarged cavities cooperating with the mold to form one enlarged portion of the article and movable away from the mold with an enlarged portion of the article subsequent to said severing, and means for cooperating with the mold to form the other enlarged portion of the article and adapted to support said other enlarged portion of the article during separation of it and the mold.

10. Apparatus of the class described adapted to be used for forming an article having spaced enlarged portions connected by a reduced dimension portion, comprising, a mold having spaced enlarged cavities connected by a cavity of reduced dimension, means adjacent said reduced cavity for severing material contained in said reduced cavity, means cooperating with said mold in shaping one of said spaced portions and adapted to support said portion subsequent to severing and during separation of the mold therefrom, supporting means for cooperating with said mold in shaping the other of said spaced portions and for lowering said other portion away from the mold and thereafter raising it to extend into a split mold, a split mold adapted to enclose said supported portions, and means for further forming said article in the split mold and joining together said separated portions while in said split mold.

11. In a device of the class described, a non-partible mold, for use in manufacturing glass stemware having foot and bowl portions joined by a stem, having a stem cavity connecting adjacent portions of foot and bowl cavities, said foot and bowl cavities being open at their remote ends for withdrawal of the respective foot and bowl portions therethrough, said mold also having a transverse opening intersecting said stem cavity, and movable severing means in said transverse opening having an edge portion movable across said stem cavity for severing material therein.

12. A device as claimed in claim 11, in which said transverse opening is a slot and in which said edge portion comprises the margin of an aperture through the severing means, said means being movable to and fro along the slot to place the aperture in and out of registry with said stem cavity.

FREDERICK Z. FOUSE.

REFERENCES CITED

The following references are of record in the file of this patent:

UNITED STATES PATENTS

| Number | Name | Date |
| --- | --- | --- |
| 132,216 | Oesterling | Oct. 15, 1872 |
| 1,603,524 | Dunbar | Oct. 19, 1926 |
| 2,272,119 | Jaeckel | Feb. 3, 1942 |

FOREIGN PATENTS

| Number | Country | Date |
| --- | --- | --- |
| 193,939 | Germany | Jan. 9, 1908 |